Sept. 1, 1925.
W. A. TURBAYNE
1,552,019
ELECTRICAL SYSTEM INVOLVING PROTECTIVE MEANS
Filed Jan. 19, 1921
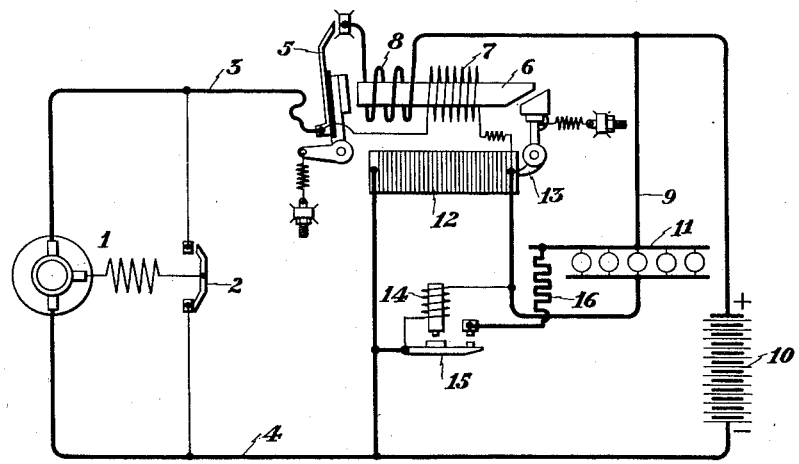
*INVENTOR.*
*William A. Turbayne*
BY
*ATTORNEYS.*

Patented Sept. 1, 1925.

1,552,019

UNITED STATES PATENT OFFICE.

WILLIAM A. TURBAYNE, OF NIAGARA FALLS, NEW YORK, ASSIGNOR, BY MESNE ASSIGNMENTS, TO THE SAFETY CAR HEATING AND LIGHTING COMPANY, OF NEW YORK, N. Y., A CORPORATION OF NEW JERSEY.

ELECTRICAL SYSTEM INVOLVING PROTECTIVE MEANS.

Application filed January 19, 1921. Serial No. 438,469.

*To all whom it may concern:*

Be it known that I, WILLIAM A. TURBAYNE, a citizen of the United States, residing at Niagara Falls, in the county of Niagara and State of New York, have invented new and useful Improvements in Electrical Systems Involving Protective Means, of which the following is a specification.

The present invention relates to electrical systems involving protective means.

More particularly the present invention relates to systems of electrical distribution of the type in which a variable speed generator charges a storage battery and supplies translating devices in parallel circuits. When the generator is inoperative to develop a predetermined voltage, the battery discharges to supply the demands of said translation circuit.

In the event of voltage fluctuations across the generator, the battery may serve to protect the translating devices against excessive voltage, for the reason that a storage battery has a very low internal resistance and will absorb the energy developed by the dynamo electric machine in cases of very high speeds. Moreover, if the translating devices are protected by means of a voltage-controlled regulator, such regulator will, in ordinary cases, protect the translating devices against destructive voltages. In case, however, the battery circuit should be open at the time that the dynamo electric machine is operating at a high speed, the voltage across the lines may obtain an excessive value beyond the ability of the translation circuit regulator to control. The translation circuit regulator, the generator field circuit, or the translating devices, or all of them, may be destroyed.

An object of the present invention is to provide a system in which the translation circuit regulator and other members of the system are protected against excessive voltages.

A further object is to provide a system having a lamp regulator in which said lamp regulator will perform its normal functions at all times, but which will be protected in cases of emergency.

A further object is to provide means, responsive to the voltage drop across the translation circuit regulator in an electric system, for throwing an extra load across the generator at such times that excess voltages are encountered.

Referring to the drawing, the one figure represents diagrammatically one embodiment of the present invention.

A variable speed generator is indicated by the numeral 1. As illustrated, the generator is of the third brush type in which the current output is maintained substantially constant. It is to be understood that other types of regulator, giving similar characteristics, may be employed. A field switch 2 is schematically illustrated for changing the field connections of the generator 1, whereby to maintain constant polarity at the generator terminals, regardless of the direction of armature rotation.

The generator 1 supplies mains 3 and 4. In the main 3 is the automatic switch 5 which is controlled by an electro-magnet 6 provided with a voltage coil 7 and series holding coil 8. Connected across mains 3 and 4 is a translation circuit 9 and storage battery 10. Translation circuit 9 includes translation devices 11 and the rheostat 12, illustrated in the drawing as a compressible pile. The rheostat 12 is provided with operating means 13 which is responsive to the energization of the electro-magnet 6.

Connected across rheostat 12 is a winding 14 which is responsive to the voltage drop across said rheostat 12. Said winding 14 controls a switch 15 which, when closed, serves to connect the loading resistance 16 across the mains 3 and 4. In the system illustrated, the electro-magnet 6 has the dual function of operating switch 5 and controlling the translation circuit regulating rheostat 12. It will be obvious, of course, that the rheostat 12 may be operated by means independent of the operating means for the automatic switch, if preferred.

A mode of operation of the above described embodiment of the present invention is substantially as follows:

When the generator 1 is inoperative to develop voltage equal to the C. E. M. F. of the battery 10, said battery 10 will discharge to supply the demands of the translation circuit 9. At this time the rheostat 12 will have minimum resistance. When the generator 1 develops a sufficiently high voltage, the winding 7 will so energize the electromagnet 6 as to cause the closing of the automatic switch 5, whereby the generator 1 may supply the demands of the translation circuit and also supply current to the storage battery 10. At this time the protective switch 15 will be open and the rheostat 12 will be controlled in a manner well understood to control the voltage across the translation devices 11. In case the connections of the storage battery 10 should be open at a time when the generator 1 is operated at high speed, the rheostat 12 will be called upon to absorb a large voltage drop thereacross. At this time the winding 14 will close switch 15, thereby throwing loading resistance 16 across mains 3 and 4. This additional load thus thrown across the line will not only divert current away from the rheostat 12 but will also bring about an immediate reduction in the line voltage. The value of this loading resistance 16 may be so chosen as to limit the voltage on the line to a safe value, regardless of the maximum expected speed of the generator 1. The translation circuit regulator will still perform its normal function in maintaining normal voltage, and in addition, the switch 15 may be so adjusted as to remove loading resistance 16 from circuit whenever the generator speed drops to a sufficiently low value, so that the rheostat 12 can handle the situation.

One embodiment of the present invention has been described in detail. Many modifications will occur to those skilled in the art. It is intended in this patent to cover all such modifications that come within the scope of the invention as defined by the appended claims.

What I claim as new and desire to secure by Letters Patent of the United States, is—

1. In an electrical system, in combination, a variable speed generator, a storage battery, a translation circuit, said translation circuit including a regulating rheostat, and means responsive to the voltage drop across said rheostat for connecting a loading resistance across said generator.

2. In an electrical system, in combination, a variable speed generator, a translation circuit and a storage battery, said translation circut being provided with a regulating rheostat, a loading resistance, and means responsive to load on said rheostat for connecting said loading resistance across said generator.

3. In a system employing variable voltage mains, a storage battery and a translation circuit, in which said translation circuit is regulated by means of a rheostat, and means for protecting said rheostat comprising means for automatically connecting a loading resistance across said mains when said rheostat is called upon to absorb an excessive amount of energy.

In witness whereof, I have hereunto subscribed my name.

WILLIAM A. TURBAYNE.